United States Patent [19]

Nelsen

[11] 4,014,368
[45] Mar. 29, 1977

[54] FLANGE PROTECTOR
[75] Inventor: John E. Nelsen, Fairview, Pa.
[73] Assignee: Alliance Plastics, Inc., Erie, Pa.
[22] Filed: Feb. 13, 1976
[21] Appl. No.: 657,734
[52] U.S. Cl. .............................. 138/109; 138/96 R; 220/324
[51] Int. Cl.$^2$ ......................................... B65D 59/06
[58] Field of Search ......... 138/109, 96 R, 89, 96 T; 220/324, 326

[56] References Cited
UNITED STATES PATENTS

| 1,903,220 | 3/1933 | Lemert | 138/96 R |
| 2,028,576 | 1/1936 | Van Dyke | 138/96 R |
| 2,082,144 | 6/1937 | Bowers | 138/96 R |
| 3,921,673 | 11/1975 | Pero | 138/109 |
| 3,942,680 | 3/1976 | Seely et al. | 220/324 |
| 3,942,681 | 3/1976 | Richardson | 138/96 R |

Primary Examiner—Robert I. Smith
Attorney, Agent, or Firm—Ralph Hammar

[57] ABSTRACT

A one piece protector for the machined surface of a flange for pipes and valves which may be installed and removed by finger pressure on integral thimbles which frictionally engage the bores of the bolt holes of the flange.

3 Claims, 2 Drawing Figures

FLANGE PROTECTOR

This invention is a flange protector which may be installed and removed without any tools. In installation, finger pressure on the thimbles moves the thimbles into friction engagement with the bolt holes and moves the cover section of the protector over the machined surface of the flange. A similar finger pressure on the thimbles, but in the reverse direction, removes the protector.

In the drawing

Figure 1:
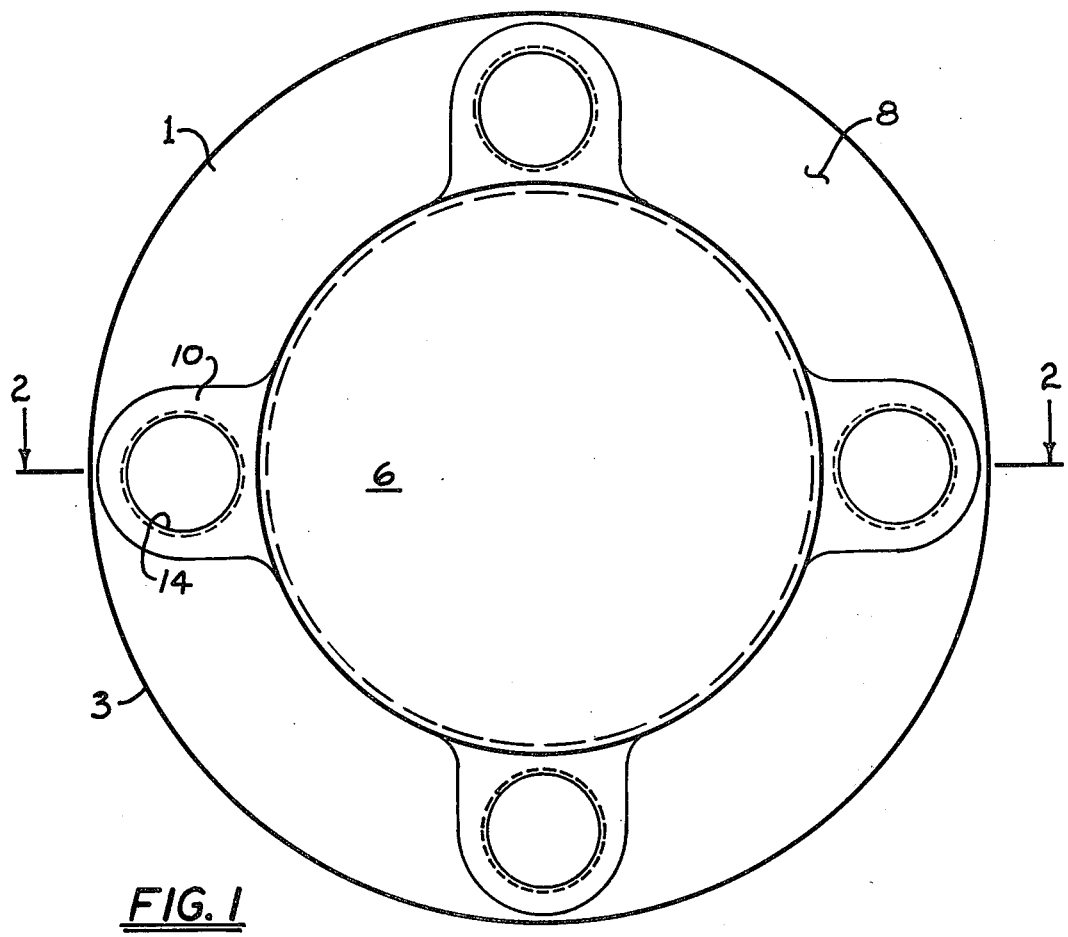
FIG. 1 is a plan view of a protector installed on a flange.
Figure 2:
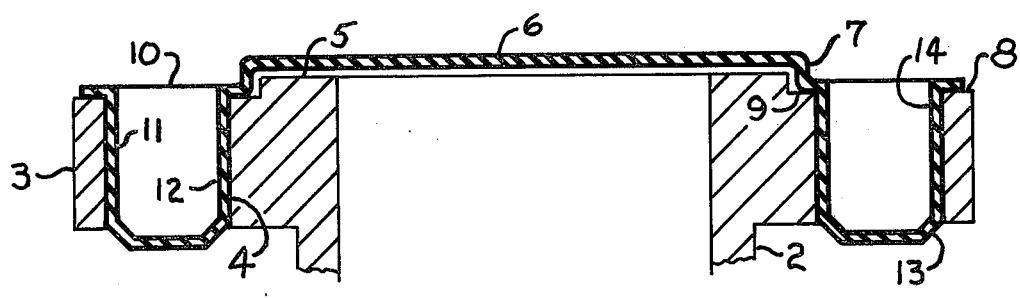
FIG. 2 is a section on line 2—2 of FIG. 1.

The drawing shows a flange 1 such as used for making connections to pipes, valves and the like. Such flanges are made to Army, Navy and ASA standards and are characterized by a hub 2 which may be connected to or integral with a pipe or valve, a flange 3 integral with the hub and having bolt holes 4 for bolting it to a mating flange to make a fluid tight connection, and a machined gasket surface 5 on the sealing face of the flange against which a gasket is compressed when the flanges are bolted together. The machined surface enters critically into the seal. Rough or irregular surfaces require greater deformation of the gasket and therefore greater bolt pressure to effect a seal. Scratches, dents or nicks may cause leakage. It is therefore essential that the machined surface 5 be protected until the flange is ready for use. It is also desirable that the protector be easily installed and removed, without requiring tools.

The flange protector has a raised circular cover section 6 having a depending peripheral skirt 7 which surrounds the annular machined gasket surface 5 and has its lower edge 9 resting on the upper surface 8 of the flange 3. The height of the skirt 7 is greater than the projection of the machined surface 5 above the surface 8. The height of the skirt 7 should be greater than the maximum projection of the machined surface 5 so there always will be some clearance between the machined surface and the upper or inner surface of the cover 6. This permits use of the protector with flanges having different styles of gasket surfaces.

As molded the lower edge 9 of the skirt 7 is coplanar with the lower surface of tabs 10 which rest on the surface 8 of the flange 3 surrounding the machined surface 5. The tabs 10 project outside the bolt circle of the flange 3 and have integral thimble-like fastening members 11 of slightly larger outside diameter than the diameter of the holes 4. The thimbles have tubular bodies 12 of a length preferably slightly greater than the thickness of the flange 3 and the bodies have closed chamfered ends 13 which lead the thimbles into the holes. Only four of the tabs 10 are needed, even though the flange 3 may have eight bolt holes. The bolt holes have a nominal diameter of approximately 1/8th inch greater than the bolts to be received in the holes. The thimbles are easily inserted into the holes 4 by the finger pressure on the open upper ends 14. The bodies 12 of the hole protectors frictionally engage the bores of the holes 4 and the resultant friction force is adequate to hold the flange protector in place until the flange arrives at the point of use. The protector is made from impact resistant material such as polyethylene and the wall thickness of the thimbles and the wall thickness of the tabs 10 is less than the wall thickness of the cover section 6, 7 so that there is enough flexibility in the hole protectors to permit easy insertion even though the hole protectors have a tight friction fit with the bolt holes. When inserted, the chamfered ends 13 extend to or slightly below the under face 15 of the flange 3 and are easily accessible to finger pressure for pushing the thimbles out of the holes when the flange protector is to be removed.

The flange protector is adapted to high speed injection molding from impact resistant thermoplastics such as polyethylene. In the mold the under surface of the tabs 10 and the lower edge surfaces 9 of the skirts 7 and the top wall of the cover 6 are all flat. After removal from the mold, cooling shrinkage usually causes warping so the surfaces 9 and 10 are no longer planar and the hole thimbles are tilted or skewed. However as soon as the thimbles are aligned and forced home into the bolt holes, the warping disappears and the surface 9 and 10 are brought into a common plane and into tight engagement with the upper surface 8 of the flange around the raised sealing surface 5.

The installation and removal of the flange protector require no tools and very little time and effort.

The particular flange illustrated in one of the common flanges which has a 1/16 inch raised gasket surface i.e. the gasket surface 5 projects 1/16 inch above the surrounding surface 8. This concentrates the forces of the bolts directly on the gasket surface. Gasket surfaces have other configurations. The flange protector is not limited to use with flanges with 1/16 inch raised surface but may be used with other flanges which have gasket surfaces which may be received beneath cover 6 and which have bolt holes registering and making a friction fit with the thimbles.

The terms upper, lower, etc have been used to describe the relative positions of the parts in the position illustrated in the drawing, and are not terms of limitation.

I claim:

1. A flange of the type having an inner annular machined surface surrounded by an outer surface with bolt holes extending through said flange, and a protector comprising a single piece of flexible impact resistant material having
   a. a cover extending over and around said inner surface with an edge of the cover engaging said outer surface
   b. an outer section integral with the cover and extending over the bolt holes and engaging said outer surface of the flange
   c. hollow thinble-like fasteners having
      i open upper ends
      ii hollow body portions depending from said outer section and received in said holes by finger pressure on said upper ends and making a fastening by friction contact with the bores of said holes
      iii and the lower ends of said body portions when received in said holes being accessible to finger pressure for pushing the fasteners out of the holes, said fasteners when received in said holes pulling the flange protector into conforming contact with the outer surface of the flange.

2. The structure of claim 1 in which the material of the protector is polyethlene.

3. The structure of claim 1 in which the thimble-like fasteners are in outwardly extending ears having lower surfaces coplanar with said edge of the cover.

* * * * *